(12) United States Patent
Hamaekers et al.

(10) Patent No.: US 6,655,667 B1
(45) Date of Patent: Dec. 2, 2003

(54) HYDRAULIC DAMPER BEARING

(75) Inventors: Arno Hamaekers, Gorxheimertal (DE); Hans-Joachim Rudolf, Stadland (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/580,295

(22) Filed: May 26, 2000

(30) Foreign Application Priority Data

May 27, 1999 (DE) .......................................... 199 24 185
Jul. 13, 1999 (DE) .......................................... 199 32 583

(51) Int. Cl.⁷ ................................................. F16F 5/00
(52) U.S. Cl. ................................................. 267/140.13
(58) Field of Search ........................... 267/140.13, 141, 267/219

(56) References Cited

U.S. PATENT DOCUMENTS

| | | | | |
|---|---|---|---|---|
| 4,262,886 A | * | 4/1981 | Le Salver et al. | 267/8 R |
| 4,352,487 A | * | 10/1982 | Shtarkman | 267/35 |
| 4,422,779 A | * | 12/1983 | Hamaekers et al. | 384/99 |
| 4,653,734 A | * | 3/1987 | Jordens | 267/8 R |
| 4,660,812 A | * | 4/1987 | Dan et al. | 267/140.1 |
| 4,789,144 A | * | 12/1988 | Brenner | 267/140.1 |
| 4,826,126 A | | 5/1989 | Katayama et al. | |
| 4,877,225 A | * | 10/1989 | Noguchi et al. | 267/140.1 |
| 5,180,148 A | * | 1/1993 | Muramatsu | 267/140.14 |
| 5,205,545 A | * | 4/1993 | Quast | 267/140.13 |
| 5,259,598 A | * | 11/1993 | Hibi et al. | 267/140.13 |
| 5,269,498 A | | 12/1993 | Bretaudeau et al. | |
| 5,344,127 A | * | 9/1994 | Hettler et al. | 267/140.13 |
| 5,462,261 A | * | 10/1995 | Eckel et al. | 267/140.13 |
| 5,560,592 A | * | 10/1996 | Shimoda et al. | 267/140.13 |
| 5,645,138 A | * | 7/1997 | Tajima et al. | 180/300 |
| 5,833,219 A | * | 11/1998 | Mellon | 267/140.13 |
| 5,848,782 A | * | 12/1998 | Hein et al. | 267/140.11 |
| 5,876,022 A | * | 3/1999 | Simuttis | 267/140.13 |
| 5,971,376 A | * | 10/1999 | Mori et al. | 267/140.13 |
| 5,988,611 A | * | 11/1999 | Takashima et al. | 267/140.13 |
| 6,224,045 B1 | * | 5/2001 | Muramatsu et al. | 267/140.13 |
| 6,244,578 B1 | * | 6/2001 | Schwerdt | 267/140.13 |
| 6,250,615 B1 | * | 6/2001 | Leibach | 267/140.13 |
| 6,250,616 B1 | * | 6/2001 | Suzuki et al. | 267/140.13 |
| 6,276,672 B1 | * | 8/2001 | Rudolf et al. | 267/140.13 |
| 6,371,462 B2 | * | 4/2002 | Gennesseaux | 267/122 |

FOREIGN PATENT DOCUMENTS

| | | |
|---|---|---|
| DE | 691 06 858 | 8/1985 |
| DE | 34 43 618 | 6/1986 |
| DE | 196 20 971 | 11/1997 |
| EP | 0 351 737 | 1/1990 |
| EP | 0 523 896 | 1/1993 |
| EP | 0 559 506 | 9/1993 |

* cited by examiner

Primary Examiner—Jack Lavinder
Assistant Examiner—Benjamin A Pezzlo
(74) Attorney, Agent, or Firm—Kenyon & Kenyon

(57) ABSTRACT

Hydraulic damper bearing for the attenuation of movement. In one embodiment the hydraulic damper bearing has a first anchoring unit and a second anchoring unit, the second anchoring unit moveable in relation to the first anchoring unit. The hydraulic damper bearing also has a spring component working between the first and the second anchoring units, an operating chamber filled with damping fluid and an equalizing chamber separate from the operating chamber and in fluid communication with the operating chamber via a damping duct which is bordered by a duct wall. The volume of the operating chamber is changed during the relative motion of the first and second anchoring support units. During this relative movement, the damping fluid is moved in the damping duct between the equalizing chamber and the operating chamber. A displacing element is arranged on the first anchoring unit and extends into the operating chamber. This element is moveable with the first anchoring unit relative to the second anchoring unit, so that the duct wall of the damping duct is formed at least in part by the displacing element.

38 Claims, 2 Drawing Sheets

HYDRAULIC DAMPER BEARING

FIELD OF THE INVENTION

The present invention relates to the attenuation or damping of movement. More specifically the present invention regards method and apparatus for hydraulically damping motion between a first anchoring unit and a second anchoring unit.

BACKGROUND

The invention relates to a hydraulic damper bearing having a first anchoring unit and a second anchoring unit moveable in relation to the first anchoring unit; a spring component working between the first and the second anchoring unit; an operating chamber filled with damping fluid, and an equalizing chamber separated from the operating chamber and connected to the operating chamber via a fluid-conducting damping duct bordered by a duct wall, the volume of the operating chamber being changed during the relative motion of the first and second anchoring units, so that damping fluid is moved in the damping duct between equalizing chamber and operating chamber; and a displacing element arranged on the first anchoring unit, which displacing element extends into the operating chamber and is moveable with the first anchoring unit relative to the second anchoring unit.

An hydraulic damper bearing is described in German Patent Application 196 20 971 A1. Through such a bearing, low-frequency oscillations can be reduced on the basis of resonance reactions of the damping fluid in the damping duct. It is desirable in this context that the damping duct be as long as possible in order to increase the mass of the fluid moved in the damping duct. A long damping duct according to the method known from German Patent Application 196 20 971 A1 results in a large height of the hydraulic bearing. Such a height is then disadvantageous when the installation space is limited, as for example in an engine compartment.

SUMMARY OF THE INVENTION

An object of the present invention is to improve a hydraulic damper bearing in such a way that a long damping duct is achieved with a concomitant small height of the bearing.

On the basis of the design according to the present invention, the displacing element effects a lengthening of the damping duct without increasing the height of the bearing. The displacing element can be so constructed that it does not lengthen the duct in an elastically non-deflected state and lengthens the duct in a partially or fully elastically deflected state of the bearing. In the lengthened damping duct a relatively large amount of damping fluid is taken in, which increases the effectiveness of the resultant vibration damping.

According to an embodiment of the invention the displacing element is formed as a stop, which limits the movement between the first and second anchoring unit.

A particularly long damping duct is achieved in that some sections of the duct wall of the damping duct are formed by a support unit arranged on the second anchoring unit. In this manner a long damping duct can be formed, whose duct wall is formed in a first section by the support unit and in a second section by the displacing element, optionally together with the support unit.

According to another alternative embodiment of the present invention, the displacing element in a partially elastically deflected state of the bearing is adjacent to the second support unit with a first contact section, which forms a first section of the duct wall. It is thereby achieved that, e.g., the damping duct is lengthened via the displacing element with the bearing under nominal load, while this is not the case with the bearing under no load.

According to another alternative embodiment of the invention, the first contact section adjacent to the support unit is elastically deformed during the relative motion of the first anchoring unit with respect to the second anchoring unit. Consequently, a relative movement of the first and second anchoring units is only insignificantly or not at all hindered.

It has been proved to be advantageous that the first contact section extends to the second support unit in the axial direction of the bearing. Consequently, the contact section forms a duct wall oriented essentially parallel to the axial direction of the bearing.

According to another embodiment of the present invention, the displacing element has a second contact section extending in the radial direction of the bearing, which contact section forms a second section of the duct wall and is adjacent to the second anchoring unit. The second contact section is flexible in order to enable transverse movements of the first anchoring unit with respect to the second anchoring unit.

The manufacture of the hydraulic bearing is simplified in that the second anchoring unit in the area of contact with the second contact section is covered with a sealing cover layer, in particular made from elastomer.

A further improvement is achieved in that a duct outlet is formed in the first contact section that connects the damping duct to the operating chamber.

The strength of the displacing element is improved in that the displacing element has a support unit embedded in elastomer and manufacturing costs can be lowered by designing the displacing element as one piece.

A further improvement of vibration insulation can be achieved in that the displacing element in the operating chamber divides up a fluid duct bordering the spring component. The damping duct in the fluid duct together with the spring component working as a distending spring forms a system capable of vibration. This system can be tuned in a manner that results in the vibration damping of a certain frequency.

According to yet another alternative embodiment of the present invention, the fluid duct is connected to the operating chamber so the fluid can flow via an opening formed in the displacing element. Such an opening influences the resonance frequency of the damping fluid in the fluid duct. The opening can also be made lockable by the second contact section of the displacing element extending in the radial direction of the bearing. In this case, if a certain pressure difference between the damping duct and the fluid duct were exceeded, the second contact section would release the otherwise closed opening.

A connection between the fluid chamber and the operating chamber is advantageously produced by an opening which is provided in the second contact section and by the duct outlet, the duct outlet and the opening being arranged adjacent to each other in particular.

The vibration insulating qualities of the bearing can be further improved in that a partition exposed to damping fluid is provided to separate the operating chamber from the equalizing chamber. The partition can be formed in particular as a flexible membrane.

In this case a long damping duct is achieved in that at least some sections of the partition are radially enclosed by the damping duct.

DETAILED DESCRIPTION

Figure 1:
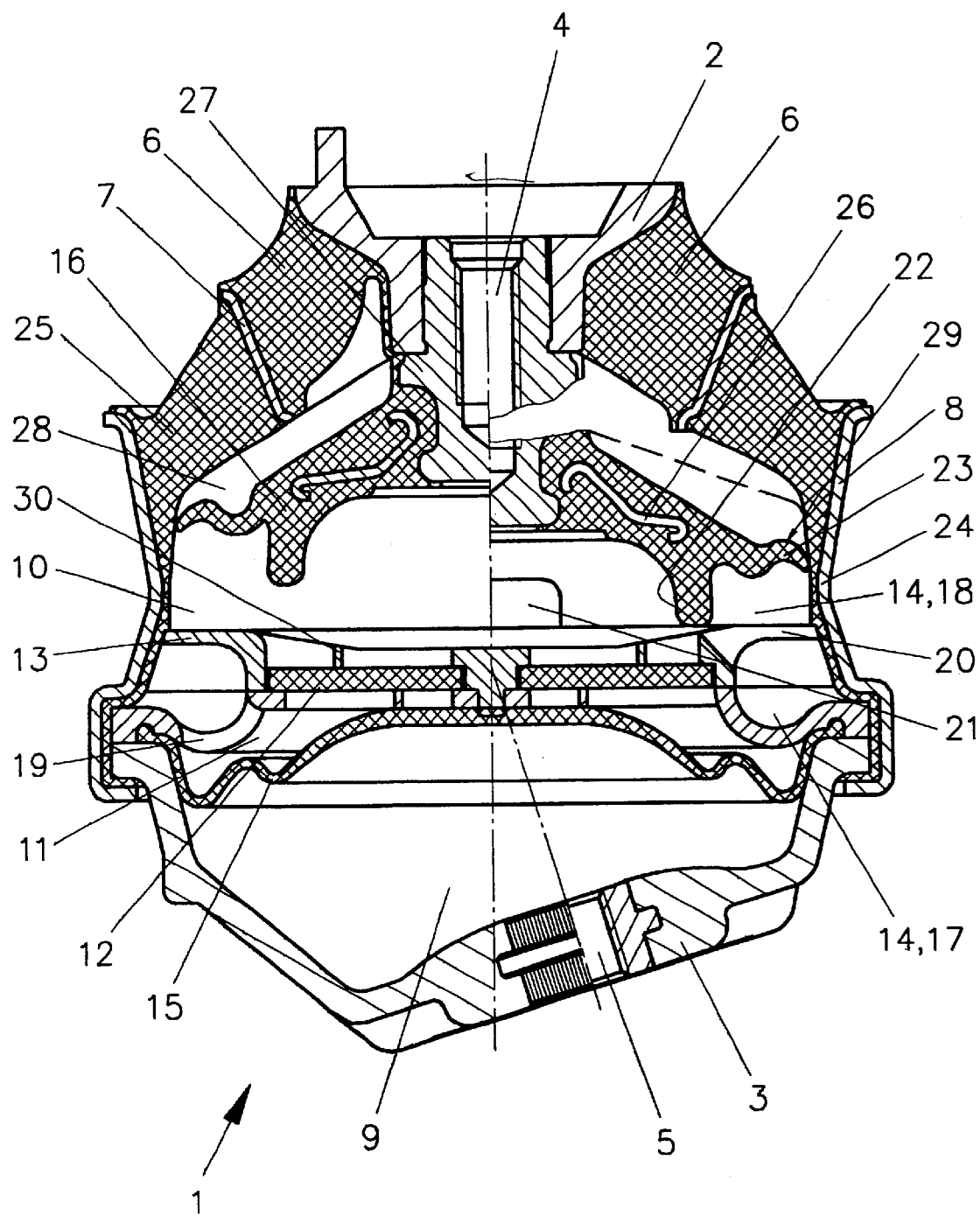
FIG. 1 shows a cross-section through a bearing according to the present invention.

In FIG. 1 a hydraulic damper bearing 1 is shown with a first anchoring unit 2 and a second anchoring unit 3 moveable relative to the first anchoring unit 2. The bearing can be connected, e.g., to the engine and to the chassis (not shown) via the first and second anchoring units 2, 3 made from metal, there being a fastening via bores 4 and 5.

Between first and second anchoring units 2, 3 a spring component 6 is provided, which is designed as a rubber component. The ring-shaped rubber component essentially has the shape of a truncated cone, the outer end in the radial direction being connected to second anchoring unit 3, and the inner end in the radial direction to first anchoring unit 2. Spring component 6 can be connected to first and second anchoring units 2, 3 by vulcanization. A support ring 7, which divides up the rubber component into a radial inner and radial outer section, is included in the rubber component forming spring component 6.

Second anchoring unit 3 has a housing section 8 which encloses bearing axis 9 in the form of a ring. Spring component 6 is attached to the end of housing section 8 facing the first anchoring unit.

In the space surrounded by the housing section 8 there is an operating chamber 10 and an equalizing chamber 11. The operating chamber is separated from the equalizing chamber by a partition 12 which is mounted on a support unit 13. The operating chamber and the equalizing chamber are filled with damping fluid and connected with each other via a fluid-conducting damping duct 14.

Operating chamber 10 is delimited by first anchoring unit 2, spring component 6, housing section 8, partition 12 and support unit 13. Equalizing chamber 11 is delimited by the side of support unit 13 and partition 12 facing away from operating chamber 10 as well as by an elastic membrane 15 shaped as a bellows.

A displacing element 16 extending into operating chamber 10 is arranged in the damping fluid on first anchoring unit 2. Displacing element 16 is moveable together with anchoring unit 2 relative to second anchoring unit 3.

During a relative movement between first anchoring unit 2 and second anchoring unit 3, the volume of operating chamber 10 fully filled with damping fluid is changed, so that damping fluid is moved by damping duct 14 between operating chamber 10 and equalizing chamber 11. Elastic membrane 15 makes it possible for a variable volume of the damping fluid to be accommodated in the equalizing chamber. Upon introduction of vibrations into bearing 1, vibration reduction is achieved so that damping fluid received in the damping duct 14 is likewise set to vibrate, whenever the natural frequency of the damping fluid is excited in damping duct 14. It is advantageous when the mass of the damping fluid moved in fluid duct 14 is as large as possible. This can be achieved by a particularly long damping duct 14.

Damping duct 14 has therefore a first section 17 and a second section 18, which lengthens first section 17.

First section 17 of damping duct 14 is formed in support unit 13 and extends in a circumferential direction externally around partition 12. The first section of the damping duct is delimited on one side by support unit 13 and on the other side by housing section 8 of second anchoring unit 3. First duct section 17 is opened via a first duct opening 19 into equalizing chamber 11 and via a second duct opening 20 into operating chamber 10 and/or to second duct section 18.

Second duct section 18 extends like first duct section 17 in a circumferential direction in the shape of a ring along housing section 8. Second duct section 18 is delimited on the one side by displacing element 16 attached to first anchoring unit 2 and on the other side by support unit 13 attached to second anchoring unit 3 and housing section 8. Second duct section 18 is opened via second duct opening 20 to first duct section 17 and via third duct opening 21 into operating chamber 10.

In a loadless, elastically non-deflected state of the bearing 1, which is represented in the left-half section of FIG. 1, displacing element 16 is not adjacent to support unit 13. In this case damping duct 14 includes only first duct section 17.

When bearing 1 is loaded and partially elastically deflected, displacing element 16 with a first contact section 22 is adjacent to support unit 13 and with a second contact section 23 to housing section 8. First and second contact sections 22, 23 therefore form together with support unit 13 and housing section 8 the duct wall of damping duct 14 in second duct section 18.

First and second contact sections 22, 23 are flexible and allow on one side a relative motion of first and second anchoring units 2, 3 along and crosswise to bearing axis 9. First contact section 22 is formed on the body of displacing element 16 and extends in the direction of bearing axis 9 to second support unit 3. First contact section 22 is so arranged that in the area of the radial outer end of partition wall 12 first section 22 comes in contact with support unit 13.

Second contact section 23 extends in the radial direction of the bearing, i.e., crosswise to bearing axis 9. For an increase in flexibility, section 23 has a corrugated cross-section profile. On the radially outer end, the second contact section has the form of a lip tapering to a point. Housing section 8 has on its inner wall a covering layer 24, in contact with second contact section 23.

Displacing element 16 is essentially made of elastomer 25 and has a support unit element 26 made of metal and embedded in the displacer. First and second contact sections 22 and 23 are designed as one piece with the body of displacing element 16 made of elastomer 25. Displacing element 16 is fastened via a pin 27 to first anchoring unit 2.

In operating chamber 10 displacing element 16 divides off a fluid duct 28 next to spring component 6. The side of spring component 6 facing bearing axis 9 and the side of displacing element 16 facing spring component 6 are essentially parallel. Fluid duct 28 can be connected via an opening 29 to the rest of operating chamber 10. In the example shown, opening 29 is closed by second contact section 23 of displacing element 16. Since this section 23 is designed to be flexible, opening 29 is released as soon as a considerable pressure difference builds up between second section 18 of damping duct 14 and fluid duct 28. Such an opening could be made in the body of displacing element 16 (not shown).

Partition 12 separating operating chamber 10 from equalizing chamber 11 is designed as an elastic membrane. It is exposed on both sides to damping fluid. Partition 12 is held by retaining sections 30 of support unit 13.

Displacing element 16 is designed as a stop which limits the motion between first and second anchoring units 2, 3.

The displacing element is adjacent to support unit 13 in its lower position, the elastically designed first contact section 22 being bent away in a radial direction outward.

Figure 2:
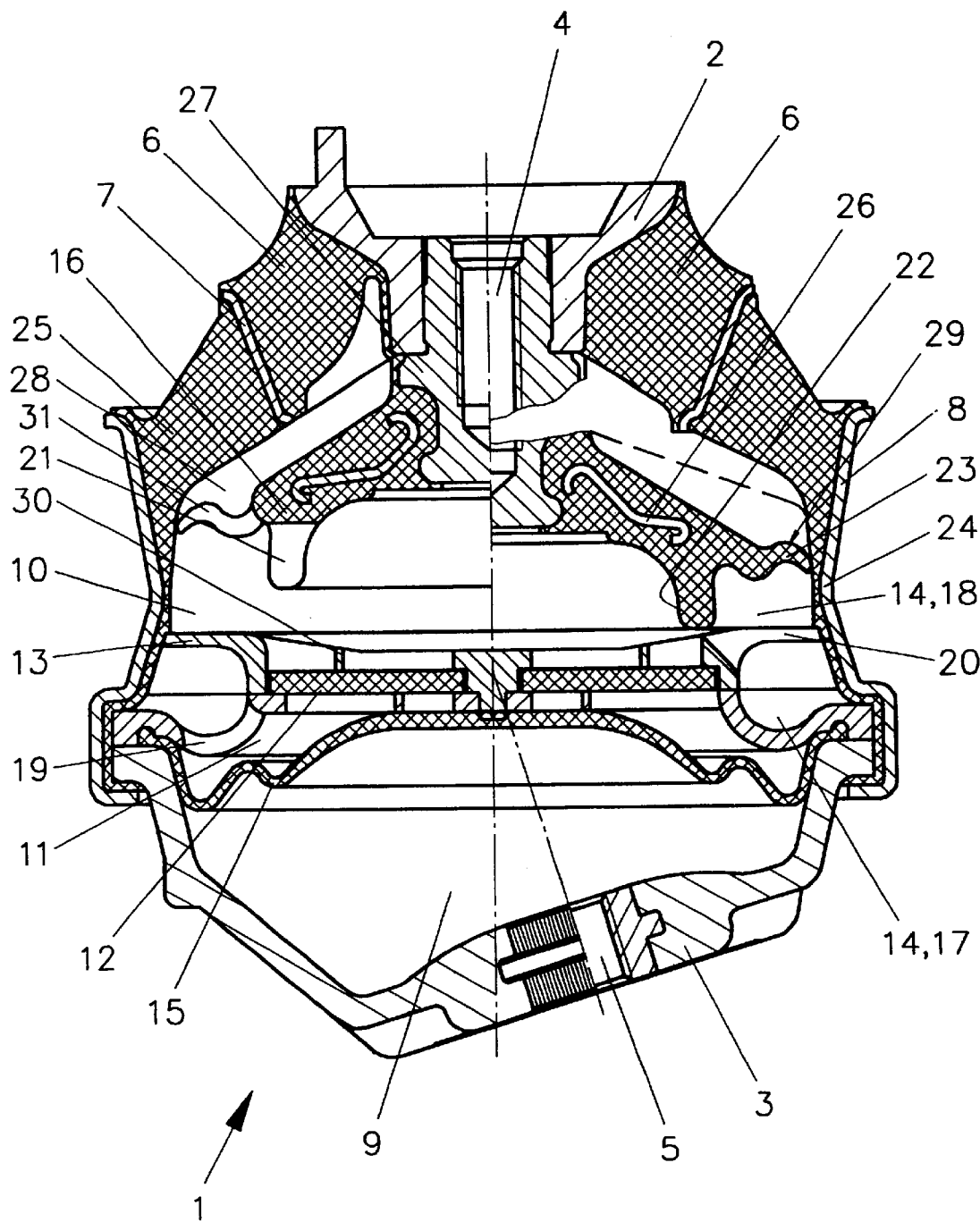
FIG. 2 shows a cross-section through a bearing according to the present invention in another embodiment.

Hydraulic damper bearing 1 shown in FIG. 2 corresponds largely to the embodiment shown in FIG. 1. Therefore the same reference numbers are used for corresponding parts. For hydraulic damper bearing 1 shown in FIG. 2, a gap 31 is provided in second contact section 23, which is arranged next to duct outlet 21. In this manner a connection is established between fluid chamber 28 and operating chamber 10.

Various embodiments of the present invention are described above. These disclosed embodiments are merely illustrative of the various ways in which the present invention may be practiced. Other embodiments, not discussed above, can also be implemented by those skilled in the art without departing from the spirit and scope of the present invention.

What is claimed is:

1. An hydraulic damper bearing comprising:
   a first anchoring unit;
   a second anchoring unit moveable in relation to the first anchoring unit;
   a spring component in physical communication with the first anchoring unit and the second anchoring unit;
   an operating chamber in physical communication with the first anchoring unit, the operating chamber containing damping fluid;
   an equalizing chamber in fluid communication with the operating chamber via a damping duct, the equalizing chamber containing damping fluid; and
   a displacing element in physical communication with the first anchoring unit, the displacing element moveable to a first position in the operating chamber and movable to a second position in the operating chamber, the displacing element having a first contact section and a second contact section wherein the damping duct has a first section and a second section extending in a circumferential direction, the first section being formed in a support situated between the equalizing chamber and the operating chamber, and the second section being at least partially formed by the first contact section and the second contact section of the displacing element.

2. The hydraulic damper of claim 1 wherein the displacing element is adapted to limit the relative movement between the first anchoring unit and the second anchoring unit.

3. The hydraulic damper of claim 1 wherein a second side of the damping duct is formed by a support unit connected to the second anchoring unit.

4. The hydraulic damper of claim 1 wherein the displacing element is elastically deflected when in the second position.

5. The hydraulic damper of claim 4 wherein the hydraulic damper is adapted to deform elastically during the relative movement between the first anchoring unit and the second anchoring unit.

6. The hydraulic damper of claim 5 wherein the first contact section extends in an axial direction relative to an axis of movement between the first anchoring unit and the second anchoring unit.

7. The hydraulic damper of claim 1 wherein the displacing element is adapted to form a side of the damping duct when the displacing element is in the second -position.

8. The hydraulic damper of claim 7 wherein the side of the damping duct formed by the displacing element is flexible.

9. The hydraulic damper of claim 1 wherein the displacing element is elastically deformable.

10. The hydraulic damper of claim 1 wherein the first anchoring unit and the second anchoring unit move axially relative to each other.

11. The hydraulic damper of claim 7 wherein a sealing layer made with an elastomer covers an area of contact on the displacing element.

12. The hydraulic damper of claim 1 wherein the displacing element is made with a polymer.

13. The hydraulic damper of claim 1 wherein the volume of the equalizing chamber is variable.

14. The hydraulic damper of claim 1 wherein the damping duct includes a duct outlet.

15. The hydraulic damper of claim 1 wherein the displacing element has a support unit embedded in an elastomer.

16. The hydraulic damper of claim 1 wherein the displacing element is designed as one piece.

17. The hydraulic damper bearing of claim 1 wherein the displacing element defines a fluid duct next to the spring component.

18. The hydraulic damper of claim 17 wherein the fluid duct is in fluid communication with the operating chamber via an opening formed in the displacing element.

19. The hydraulic damper of claim 17 wherein a partition exposed to damping fluid separates the operating chamber from the equalizing chamber.

20. The hydraulic damper of claim 19 wherein the partition is radially enclosed at least in part by the damping duct.

21. An hydraulic damper comprising:
   a first anchoring unit;
   a second anchoring unit having a housing;
   a spring component connecting the first anchoring unit and the second anchoring unit;
   an operating chamber in fluid communication with the spring component;
   a displacing element in fluid communication with the operating chamber, the displacing element having a first contact section and a second contact section and a second contact section which is flexible, the displacing element movable between a first position and a second position; and
   an equalizing chamber in fluid communication with the operating chamber through a damping duct, wherein the damping duct has a first section and a second section, the first section being formed in a support situated between the equalizing chamber and the operating chamber, and the second section being at least partially formed by the first contact section and the second contact section of the displacing element.

22. A method of damping movement with an hydraulic damper comprising:
   (a) storing fluid in an operating chamber and an equalizing chamber of the hydraulic damper, the operating chamber and the equalizing chamber in fluid communication with one another via a damping duct; and
   (b) lengthening the length of the damping duct by sealably engaging first and second contact sections of a displacing element located within the operating chamber with a support unit.

23. A method of damping movement with an hydraulic damper comprising:
   (a) storing fluid in an operating chamber and an equalizing chamber of the hydraulic damper, the operating chamber and the equalizing chamber in fluid communication with one another via a damping duct;
   (b) lengthening the length of the damping duct by sealably engaging a displacing element located within the operating chamber with a support unit; and (c) releasing fluid from the damping duct when the pressure on the fluid exceeds a predetermined pressure.

24. A hydraulically damping bearing comprising:

a first anchoring part;

a second anchoring part that is moveable relative to the first anchoring part;

a spring element acting between the first and the second anchoring parts;

a operating chamber filled with damping fluid;

a equalizing chamber separate from the operating chamber and in fluid communication with the operating chamber via a damping channel delimited by a channel wall, the volume of the operating chamber being changed in response to the relative motion of the first and second anchoring parts so that damping fluid is moved in the damping channel between the equalizing chamber and the operating chamber;

a partition which is acted upon by damping fluid and that separates the operating chamber from the equalizing chamber, and is supported at a supporting body;

a displacer having first and second contact regions, the displacer being mounted to the first anchoring part and which extends into the operating chamber, and is moveable, together with the first anchoring part relative to the second anchoring part, wherein the damping channel has a first and a second channel segment extending in the circumferential direction, the first segment of the damping channel being formed in the supporting body, and the channel wall of the second segment of the damping channel being at least partially formed by the first and second contact regions of the displacer.

25. The bearing as recited in claim 24, wherein the displacer is a limit stop which limits the movement between the first and second anchoring parts.

26. The bearing as recited in claim 24, wherein the channel wall of the damping channel is formed in part by a supporting body situated on the second anchoring part.

27. The bearing as recited in claim 24, wherein, when the bearing is in a partially elastically deflected state, the first contact section of the displacer, which forms a first section of the channel wall, rests on the supporting body.

28. The bearing as recited in claim 27, wherein the displacer is elastically deformed while resting against the support unit, in response to the movement of the first anchoring part relative to the second anchoring part.

29. The bearing as recited in claim 25, wherein the first contact section extends in an axial direction of the bearing, towards the supporting body.

30. A hydraulically damping bearing comprising:

a first anchoring part;

a second anchoring part that is moveable relative to the first anchoring part;

a spring element acting between the first and the second anchoring parts;

a operating chamber filled with damping fluid;

a equalizing chamber separate from the operating chamber and in fluid communication with the operating chamber via a damping channel delimited by a channel wall, the volume of the operating chamber being changed in response to the relative motion of the first and second anchoring parts so that damping fluid is moved in the damping channel between the equalizing chamber and the operating chamber;

a partition which is acted upon by damping fluid and that separates the operating chamber from the equalizing chamber, and is supported at a supporting body;

a displacer having first and second contact regions, the displacer being mounted to the first anchoring part and which extends into the operating chamber, and is movable, together with the first anchoring part relative to the second anchoring part, wherein the damping channel has a first and a second channel segment extending in the circumferential direction, the first segment of the damping channel being formed in the supporting body, and the channel wall of the second segment of the damping channel being at least partially formed by the first and second contact regions of the displacer, wherein the second contact section extends in a radial direction of the bearing, forms a second segment of the channel wall, and is adjacent to the second anchoring part.

31. The bearing as recited in claim 30, wherein the second contact section is flexible.

32. The bearing as recited in claim 28, wherein, in the area of contact of the second contact section, the second anchoring part is covered by a sealing cover layer that is specially made of an elastomer.

33. The bearing as recited in claim 24, wherein the displacer has a supporting body embedded in an elastomer.

34. The bearing as recited in claim 24, wherein the displacer is formed in one piece.

35. The bearing as recited in claim 24, wherein, in the operating chamber, the displacer partitions off a fluid chamber adjacent to the spring element.

36. The bearing as recited in claim 35, wherein the fluid chamber is in fluid communication with the rest of the operating chamber via an opening formed in the displacer.

37. The bearing as recited in claim 24, wherein a connection is established between the fluid chamber and the operating chamber through an opening which is provided in the second contact section, and through the channel outlet, the channel outlet and the opening being situated next to each other.

38. The bearing as recited in claim 24, wherein at least a section of the partition is radially enclosed by the damping channel.

* * * * *